United States Patent
Ogawa et al.

(10) Patent No.: US 8,403,493 B2
(45) Date of Patent: Mar. 26, 2013

(54) PROJECTION APPARATUS AND PROJECTION METHOD FOR CONTROLLING EMISSION OF PLURAL COLOR LIGHT SOURCES HAVING DIFFERENT LUMINOUS EFFICIENCIES

(75) Inventors: Masahiro Ogawa, Ome (JP); Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 286 days.

(21) Appl. No.: 12/888,659

(22) Filed: Sep. 23, 2010

(65) Prior Publication Data
US 2011/0075103 A1 Mar. 31, 2011

(30) Foreign Application Priority Data

Sep. 28, 2009 (JP) ................. 2009-223333

(51) Int. Cl.
G03B 21/26 (2006.01)
G03B 21/14 (2006.01)
G02B 5/30 (2006.01)
G02B 27/28 (2006.01)
H04N 9/12 (2006.01)
G09G 3/34 (2006.01)

(52) U.S. Cl. ................. 353/31; 353/94; 353/84; 353/85; 353/121; 348/743; 359/491.01; 345/84; 345/32

(58) Field of Classification Search ................. 353/31, 353/94, 85, 84, 121; 348/743, 742; 359/491.01; 345/84, 32
See application file for complete search history.

(56) References Cited

U.S. PATENT DOCUMENTS 5,428,408 A * 6/1995 Stanton .................. 348/742
2010/0079730 A1 * 4/2010 Shibasaki .................. 353/31

FOREIGN PATENT DOCUMENTS

JP 2004-341105 A 12/2004
JP 2007156270 A * 6/2007

* cited by examiner

Primary Examiner — Georgia Y Epps
Assistant Examiner — Magda Cruz
(74) Attorney, Agent, or Firm — Holtz, Holtz, Goodman & Chick, P.C.

(57) ABSTRACT

A light source controller is configured to control timings of driving the first and second light sources and the light-source light generator, so that the light-source light of two or more colors generated by the light-source light generator and the light-source light emitted from the second light source are cyclically generated, by setting a light-emitting period of at least one light-source light color having a higher luminous efficiency out of the two or more colors generated by the light-source light generator, shorter than those of the other light-source light colors, and setting a drive power of the first light source during generation of the light-source light color whose light-emitting period is set short, greater than a drive power of the first light source during generation of the other light-source light colors.

8 Claims, 10 Drawing Sheets

PROJECTION APPARATUS AND PROJECTION METHOD FOR CONTROLLING EMISSION OF PLURAL COLOR LIGHT SOURCES HAVING DIFFERENT LUMINOUS EFFICIENCIES

CROSS-REFERENCE TO RELATED APPLICATIONS

This application is based upon and claims the benefit of priority from prior Japanese Patent Application No. 2009-223333, filed Sep. 28, 2009, the entire contents of which are incorporated herein by reference.

BACKGROUND OF THE INVENTION

1. Field of the Invention

The present invention relates to a light source unit, a projection apparatus, and a projection method suitable for a projector or the like.

2. Description of the Related Art

Jpn. Pat. Appln. KOKAI Publication No. 2004-341105 (hereinafter, Patent Document 1), for example, discloses a technique including a light-emitting diode or semiconductor laser to emit ultraviolet light, and a color wheel which has a fluorescent layer formed on the back side for emitting visible light corresponding to each of red, green, and blue light by radiating ultraviolet light and has a visible light reflection film formed on the front side close to a light source, having characteristics to transmit ultraviolet light and reflect visible light.

In the technique disclosed in Patent Document 1, when a fluorescent substance is generated by using excitation light, according to the properties of the fluorescent substance, the fluorescent substance is saturated when the excitation light per unit area radiated to the fluorescent substance exceeds a certain value, and the luminous efficiency of the fluorescent substance may be suddenly reduced.

Despite this, Patent Document 1 does not mention the excitation light per unit area radiated to the fluorescent substance and saturation of fluorescent substance. Therefore, there is a problem that the absolute quantity of light becomes insufficient if excitation light is decreased to avoid saturation of the fluorescent substance, and the luminous efficiency of the fluorescent substance is decreased if excitation light is increased to obtain a sufficient absolute light quantity.

BRIEF SUMMARY OF THE INVENTION

Accordingly, it is an object of the present invention to project an image with high brightness and high color reproducibility, considering different emission efficiencies of each color by combining a light source and fluorescent substance.

According to one aspect of the present invention, there is provided a light source unit comprising: a light source configured to emit light in a predetermined wavelength range; a light-source light generator configured to generate light-source light of two or more colors with different luminous efficiencies by time-sharing by using the light emitted from the light source; and a light source controller configured to control timings of driving the light source and light-source light generator, so that the light-source light of two or more colors generated by the light-source light generator are cyclically generated, by setting a light-emitting period of at least one light-source light color having a higher luminous efficiency out of the two or more colors generated by the light-source light generator, shorter than those of the other light-source light colors, and setting a drive power of the light source during generation of the light-source light color whose light-emitting period is set short, greater than a drive power of the light source during generation of the other light-source light colors.

According to one aspect of the present invention, there is provided a light source unit comprising: a first light source configured to emit light in a first wavelength range; a light-source light generator configured to generate light-source light of two or more colors with different luminous efficiencies by time-sharing by using the light emitted from the first light source; a second light source configured to emit light in a second wavelength range different from the first wavelength range; and a light source controller configured control timings of driving the first and second light sources and the light-source light generator, so that the light-source light of two or more colors generated by the light-source light generator and the light-source light emitted from the second light source are cyclically generated, by setting a light-emitting period of at least one light-source light color having a higher luminous efficiency out of the two or more colors generated by the light-source light generator, shorter than those of the other light-source light colors, and setting a drive power of the first light source during generation of the light-source light color whose light-emitting period is set short, greater than a drive power of the first light source during generation of the other light-source light colors.

According to one aspect of the present invention, there is provided a projection apparatus comprising: a light source configured to emit light in a predetermined wavelength range; a light-source light generator configured to generate light-source light of two or more colors with different luminous efficiencies by time-sharing by using the light emitted from the light source; a light source controller configured to control timings of driving the light source and light-source light generator, so that the light-source light of two or more colors generated by the light-source light generator are cyclically generated, by setting a light-emitting period of at least one light-source light color having a higher luminous efficiency out of the two or more colors generated by the light-source light generator, shorter than those of the other light-source light colors, and setting a drive power of the light source during generation of the light-source light color whose light-emitting period is set short, greater than a drive power of the light source during generation of the other light-source light colors; an input unit configured to input an image signal; and a projector configured to form a light figure of colors corresponding to an image signal input from the input unit by using the light-source light generated based on the control of the light source controller, and to project the light figure.

According to one aspect of the present invention, there is provided a projection apparatus comprising: a first light source configured to emit light in a first wavelength range; a light-source light generator configured to generate light-source light of two or more colors with different luminous efficiencies by time-sharing by using the light emitted from the first light source; a second light source configured to emit light in a second wavelength range different from the first wavelength range; a light source controller configured to control timings of driving the first and second light sources and the light-source light generator, so that the light-source light of two or more colors generated by the light-source light generator and the light-source light emitted from the second light source are cyclically generated, by setting a light-emitting period of at least one light-source light color having a higher luminous efficiency out of the two or more colors generated by the light-source light generator, shorter than those of the other light-source light colors, and setting a drive power of the first light source during generation of the light-source light color whose light-emitting period is set short, greater than a drive power of the first light source during generation of the other light-source light colors; an input unit configured to input an image signal; and a projector configured to form a light figure of colors corresponding to an image signal input from the input unit, by using the light-source light generated based on the control of the light source controller, and to project the light figure.

According to one aspect of the present invention, there is provided a projection method applied to a projection apparatus including a light source configured to emit light in a predetermined wavelength range, a light-source light generator configured to generate light-source light of two or more colors with different luminous efficiencies by time-sharing by using the light emitted from the light source, an input unit configured to input an image signal, and a projector configured to form a light figure of colors corresponding to an image signal input from the input unit by using light-source light, and to project the light figure, the method comprising: controlling timings of driving the light source and light-source light generator, so that the light-source light of two or more colors generated by the light-source light generator are cyclically generated, by setting a light-emitting period of at least one light-source light color having a higher luminous efficiency out of the two or more colors generated by the light-source light generator, shorter than those of the other light-source light colors, and setting a drive power of the light source during generation of the light-source light color whose light-emitting period is set short, greater than a drive power of the light source during generation of the other light-source light colors.

According to one aspect of the present invention, there is provided a projection method applied to a projection apparatus including a first light source configured to emit light in a first wavelength range, a light-source light generator configured to generate light-source light of two or more colors with different luminous efficiencies by time-sharing by using the light emitted from the first light source, a second light source configured to emit light in a second wavelength range different from the first wavelength range, an input unit configured to input an image signal, and a projector configured to form a light figure of colors corresponding to an image signal input from the input unit by using light-source light, and to project the light figure, the method comprising: controlling timings of driving the first and second light sources and the light-source light generator, so that the light-source light of two or more colors generated by the light-source light generator and the light-source light emitted from the second light source are cyclically generated, by setting a light-emitting period of at least one light-source light color having a higher luminous efficiency out of the two or more colors generated by the light-source light generator, shorter than those of the other light-source light colors, and setting a drive power of the first light source during generation of the light-source light color whose light-emitting period is set short, greater than a drive power of the first light source during generation of the other light-source light colors.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

(First Embodiment)

A first embodiment applied to a DLP (a registered trademark) type data projector will be described with reference to the drawings.

Figure 1:
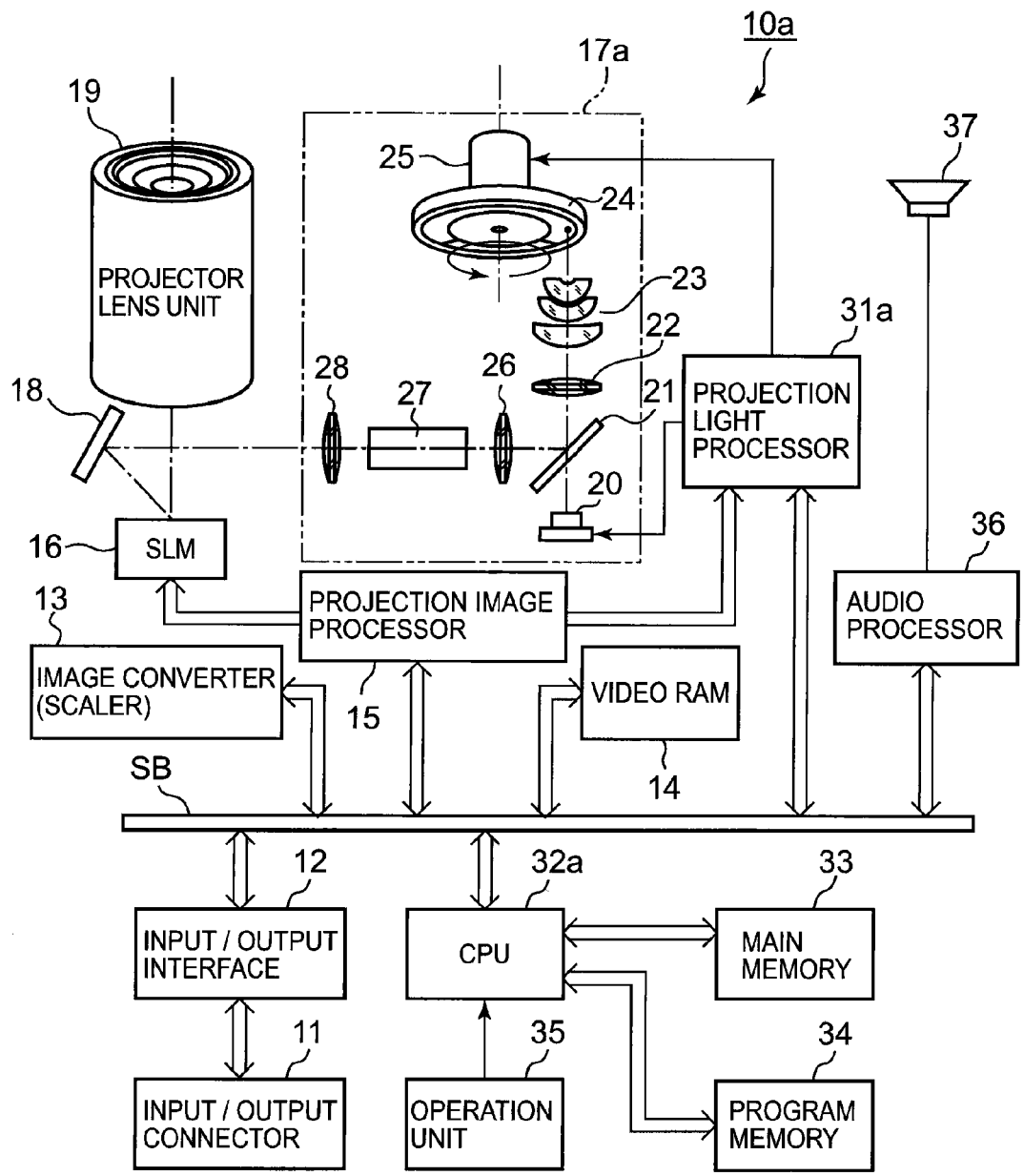
FIG. 1 is a block diagram showing a configuration of functional circuits of a whole data projector according to a first embodiment of the present invention.

FIG. 1 is a block diagram showing a schematic functional configuration of electronic circuits provided in a data projector 10a according to the first embodiment.

A reference number 11 denotes an input/output connector, which includes a pin-jack (RCA) type video input terminal, D-sub 15 type RGB input terminal, and Universal Serial Bus (USB) connector, for example.

Image signals of various standards input to the input/output connector 11 are applied to an image converter 13 through an input/output interface (I/F) 12 and a system bus SB.

The image converter 13 converts the input image signal into a predetermined format suitable for projection, writes the image signal into a video RAM 14 or a buffer memory for display if necessary, reads the written image signal, and transmits the read image signal to a projection image processor 15.

At this time, data such as symbols or the like indicating various operating states for an on-screen display (OSD) are superimposed on the image signal read from the video RAM 14, if necessary, and the obtained signal is written again into the video RAM 14. Thereafter, a processed image signal is read out, and transmitted to the projection image processor 15.

The projection image processor 15 drives a micromirror element 16 as a spatial light modulator (SLM) element according to the input image signal, by high-speed time-sharing realized by multiplying a frame rate according to a predetermined format, for example, 120 frames/second, division number of color component, and number of display gradation.

The micromirror element 16 forms a light figure by reflecting light by turning on and off the tilt angles of two or more minute mirrors arranged in an array equivalent to XGA (768×1024 pixels), for example, at high speed.

On the other hand, a light source unit 17a cyclically emits primary color light of red, green, and blue by time-sharing. The primary-color light from the light source unit 17a is reflected on a mirror 18, and is applied to the micromirror element 16.

The micromirror element 16 reflects the light, and forms a light figure. The light figure is projected on a not-shown screen as an object of projection, through the lens unit 19.

The light source unit 17a has a semiconductor laser 20 as a light source to emit blue laser light.

The blue laser light emitted from the semiconductor laser 20 is focused at one point on the surface of a color wheel 24 through a dichroic mirror 21, a lens 22, and a lens group 23. The color wheel 24 is rotated by a motor 25 basically at a constant speed. The dichroic mirror 21 has spectral characteristics to transmit only a blue wavelength through the central area, and to reflect visible wavelengths through the peripheral area.

Figure 2:
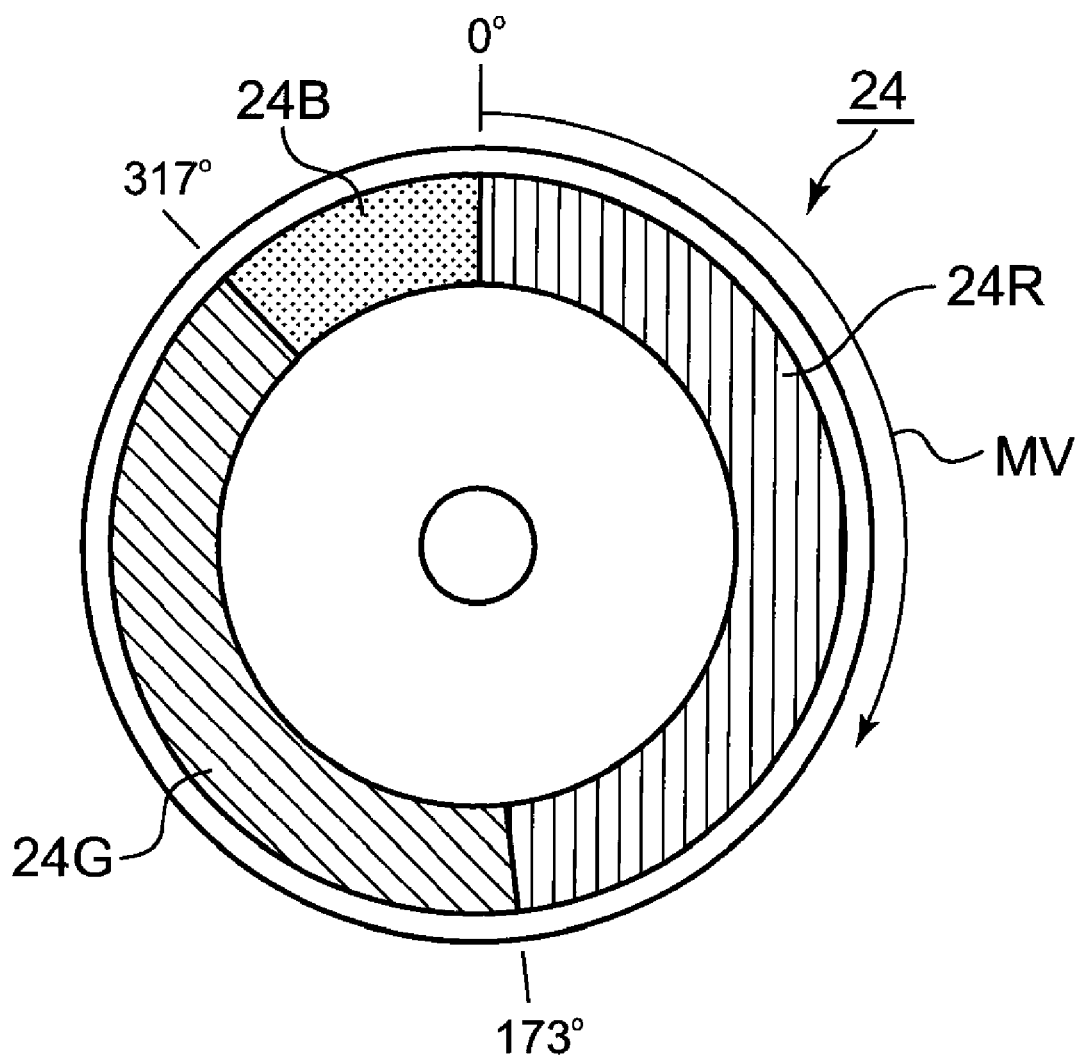
FIG. 2 is a plan view showing a configuration of a color wheel according to the first embodiment.

FIG. 2 shows a plan view of the color wheel 24. On one side of a flat disc, a red fluorescence reflection part 24R, a green fluorescence reflection part 24G, and a blue light diffuse reflection part 24B are formed like a ring.

The red fluorescence reflection part 24R is formed by coating a nitride fluorescent substance, for example, on an area of the flat ring-shaped color wheel 24. The green fluorescence reflection part 24G is formed by coating an oxide fluorescent substance, for example, on another area of the color wheel 24. The blue light diffuse reflection part 24B is formed by sticking an arc-shaped metal plate with a hairline-finished surface on the other area of the color wheel 24.

In FIG. 2, a reference position of the color wheel 24 is set at a position of 0°, which corresponds to the timing of switching an image frame. This means that when the color wheel 24 is rotated, the blue light emitted from the semiconductor laser 20 is cyclically applied to the red fluorescence reflection part 24R, green fluorescence reflection part 24G, and blue light diffuse reflection part 24S on the circumference of the flat disc, as indicated by the arrow MV.

The red fluorescence reflection part 24R is arranged at a position of 0° to 173° in a rotation phase corresponding to an image frame, with a center angle of about 173°. The green fluorescence reflection part 24G is arranged at a position of 173° to 317° in a rotation phase corresponding to an image frame, with a center angle of about 144°. The blue light diffuse reflection part 24B is arranged at a position of 317° to) 360° (0° in the same rotation phase, with a center angle of about 43°.

When the red fluorescence reflection part 24R of the color wheel 24 is located at a laser light radiating position, red light is excited by radiating laser light, and the excited red light is reflected on the color wheel 24. Thereafter, the red light is reflected on the dichroic mirror 21 through the lens group 23 and lens 22.

The red light is transmitted from a lens 26 to an integrator 27, where the light is bound into a flux of substantially even brightness distribution, and is sent to the mirror 18 through a lens 28.

When the green fluorescence reflection part 24G of the color wheel 24 is located at a laser light radiating position, green light is excited by radiating laser light. When the blue light diffuse reflection part 24B of the color wheel 24 is located at a laser light radiating position, blue laser light is diffused and reflected on the blue light diffuse reflection part 24B.

Similarly to the red light, the green light excited by the green fluorescence reflection part 24G is reflected on the dichroic mirror 21 through the lens group 23 and lens 22. Thereafter, the green light is transmitted from the lens 26 to the integrator 27, where the light is bound into a flux of substantially even brightness distribution, and is sent to the mirror 18 through the lens 28.

The blue light reflected on the blue light diffuse reflection part 24B is sent to the dichroic mirror 21 through the lens group 23 and lens 22, and is reflected on the peripheral area of the dichroic mirror, not at the central part. Thereafter, the blue light is transmitted from the lens 26 to the integrator 27, where the light is bundled into a flux of substantially even brightness distribution, and is sent to the mirror 18 through a lens 28.

A projection light processor 31a controls the emission timing and intensity of the semiconductor laser 20 of the light source unit 17a, and the rotation of the color wheel 24 by the motor 25. The projection light processor 31a is given a timing signal of image data from the projection image processor 15.

A CPU 32a controls all operations of the above circuits. The CPU 32a executes control operations of the data projector 10a by using a main memory 33 configured in a DRAM, and a program memory 34 including an electrically rewritable nonvolatile memory storing operation programs and various standard data.

The CPU 32a executes various projection operations according to key operation signals from an operation unit 35.

The operation unit 35 includes a key operation section provided in the main body of the data projector 10a, and a laser-receiving section configured to receive infrared light from a not-shown remote controller dedicated to the data projector 10a, and directly outputs a signal from a key of the key operation unit in the main body operated by the user or a remote controller, to the CPU 32a.

The operation unit 35 has a focus adjustment key (FOCUS), a zoom adjustment key (ZOOM), an input image switching key (INPUT), a menu key (MENU), cursor keys (←, →, ↑, and ↓), a set key (ENTER), and a cancel key (ESC), in addition to the key operation unit and remote controller.

The CPU 32a is connected to a sound processor 36 through the system bus SB. The sound processor 36 is provided with a sound source circuit such as a PCM sound source or the like, converts sound data provided at the time of projection operation into analog data, drives a speaker 37 to sound loudly, or to generate a beep sound if necessary.

Next, operations of the above embodiment will be explained.

Here, periods to project primary color images of blue, red and green constituting one frame of a color image to be projected are called R-field, G-field and B-field. As described above, for one rotation 360° of the color wheel 24 rotating at a constant speed, the time ratio r:g:b among the R-field, R-field and G-field is 173°:144°:43° in terms of the center angle of the color wheel 24.

Figure 3:
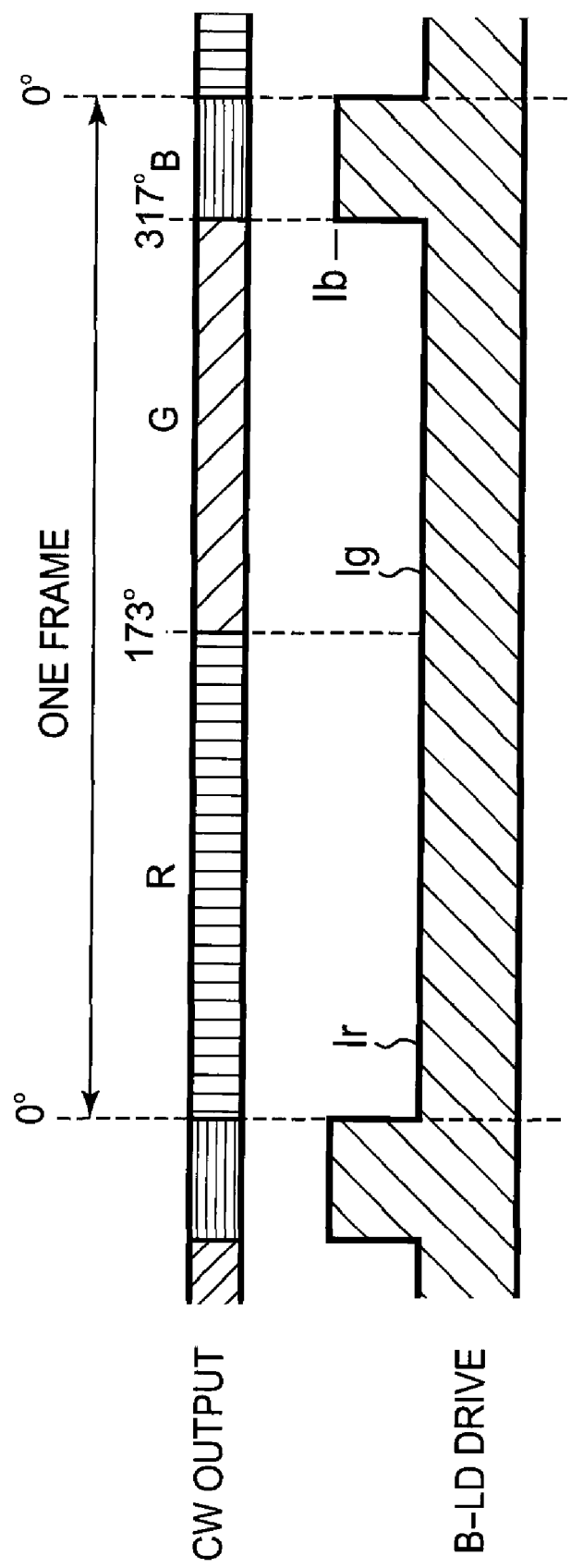
FIG. 3 is a view showing the timing of driving a light source unit according to the first embodiment.

FIG. 3 shows the contents of driving the light source unit 17a by the projection light processor 31a under the control of the CPU 32a.

In FIG. 3, the CW output indicates the color of light-source light emitted from the rotating color wheel (CW) 24.

The B-LD drive in FIG. 3 indicates a drive current of the semiconductor laser 20. In the first R-field of a frame, a drive current Ir for a red image is applied to the semiconductor laser 20. For the drive current Ir, a current value controlled to the degree not to cause saturation decreasing the luminous efficiency is selected, considering the emission characteristics of the fluorescent substance, for example nitride fluorescent substance, forming the red fluorescence reflection part 24R.

During the period equivalent to 173° in terms of the center angle of the color wheel 24, in which the semiconductor laser 20 emits blue light to the red fluorescence reflection part 24R, the red light generated by the excitation is transmitted from the red fluorescence reflection part 24R to the dichroic mirror 21 through the lens group 23 and lens 22, and is reflected on the dichroic mirror 21. Thereafter, the red light is reflected on the mirror 18 through the lens 26, integrator 27 and lens 28, and then applied to the micromirror element 16. At this time, the micromirror element 16 displays an image corresponding to the red light by driving the projection image processor 15.

Therefore, a red light figure is formed by the reflected light from the micromirror element 16, and the projector lens unit 19 projects the light figure on a not-shown screen as an object of projection.

Similarly, in the next G-field, a drive current Ig for a green image is applied to the semiconductor laser 20. For the drive current Ig, a current value controlled to the degree not to cause saturation decreasing the luminous efficiency is selected, considering the emission characteristics of the fluorescent substance, for example oxide fluorescent substance, forming the green fluorescence reflection part 24G.

During the period equivalent to 144° in terms of the center angle of the color wheel 24, in which the semiconductor laser 20 emits blue light to the green fluorescence reflection part 24G, the green light generated by the excitation is transmitted from the green fluorescence reflection part 24G to the dichroic mirror 21 through the lens group 23 and lens 22, and is reflected on the dichroic mirror 21. Thereafter, the green light is reflected on the mirror 18 through the lens 26, integrator 27 and lens 28, and then applied the micromirror element 16. At this time, the micromirror element 16 displays an image corresponding to the green light by driving the projection image processor 15

Therefore, a green light figure is formed by the reflected light from the micromirror element 16, and the projector lens unit 19 projects the light figure on a not-shown screen as an object of projection.

in the next B-field, a drive current Ib for a blue image is applied to the semiconductor laser 20. As for the drive current Ib, excitation by fluorescent substance is unnecessary as shown by the B-LD drive in FIG. 3. Therefore, for the drive current Ib, a higher current value than Ir and Ig can be set within a range not exceeding the electrical operating conditions of the semiconductor laser 20.

During the period equivalent to 43° in terms of the center angle of the color wheel 24, in which the semiconductor laser 20 emits blue light to the blue light diffuse reflection part 24B, the blue light diffused and reflected by the blue light diffuse reflection part 24B is transmitted to the dichroic mirror 21 through the lens group 23 and lens 22, and is reflected on the dichroic mirror 21. Thereafter, the blue light is reflected on the mirror 18 through the lens 26, integrator 27 and lens 28, and then applied to the micromirror element 16. At this time, the micromirror element 16 displays an image corresponding to the blue light by driving the projection image processor 15.

Therefore, a blue light figure is formed by the reflected light from the micromirror element 16, and the projector lens unit 19 projects the light figure on a not-shown screen as an object of projection.

In other words, in the R-field and G-field using light from a fluorescent substance emitting laser light as excitation light, the fluorescent substance has low luminous efficiency, which is likely to saturate an output light with respect to a high input light, and bright light with high luminous efficiency can be obtained by emitting light at a current value controlled to be sufficiently low not to cause saturation and setting the emission period long enough to compensate the total amount of emission light likely to decrease at a low current value. White balance can also be kept optimum in this condition.

Further, in the R-field and G-field, a different color fluorescent substance is used, and the luminous efficiency is different. Therefore, the emission period and drive current value may be set by considering the different luminous efficiency of the fluorescent substance.

In contrast, in the B-field, the color of light emitted from the semiconductor laser 20 is used as a light source, without using a fluorescent substance, and a bright light figure can be formed at a high current value compensating for the short emission period.

As described above, in the first embodiment, it is possible to project a bright image with high color reproducibility, considering different luminous efficiencies for each color by combining a light source and fluorescent substance.

(Second Embodiment)

A second embodiment applied to a DLP (a registered trademark) type data projector will be described with reference to the drawings.

Figure 4:
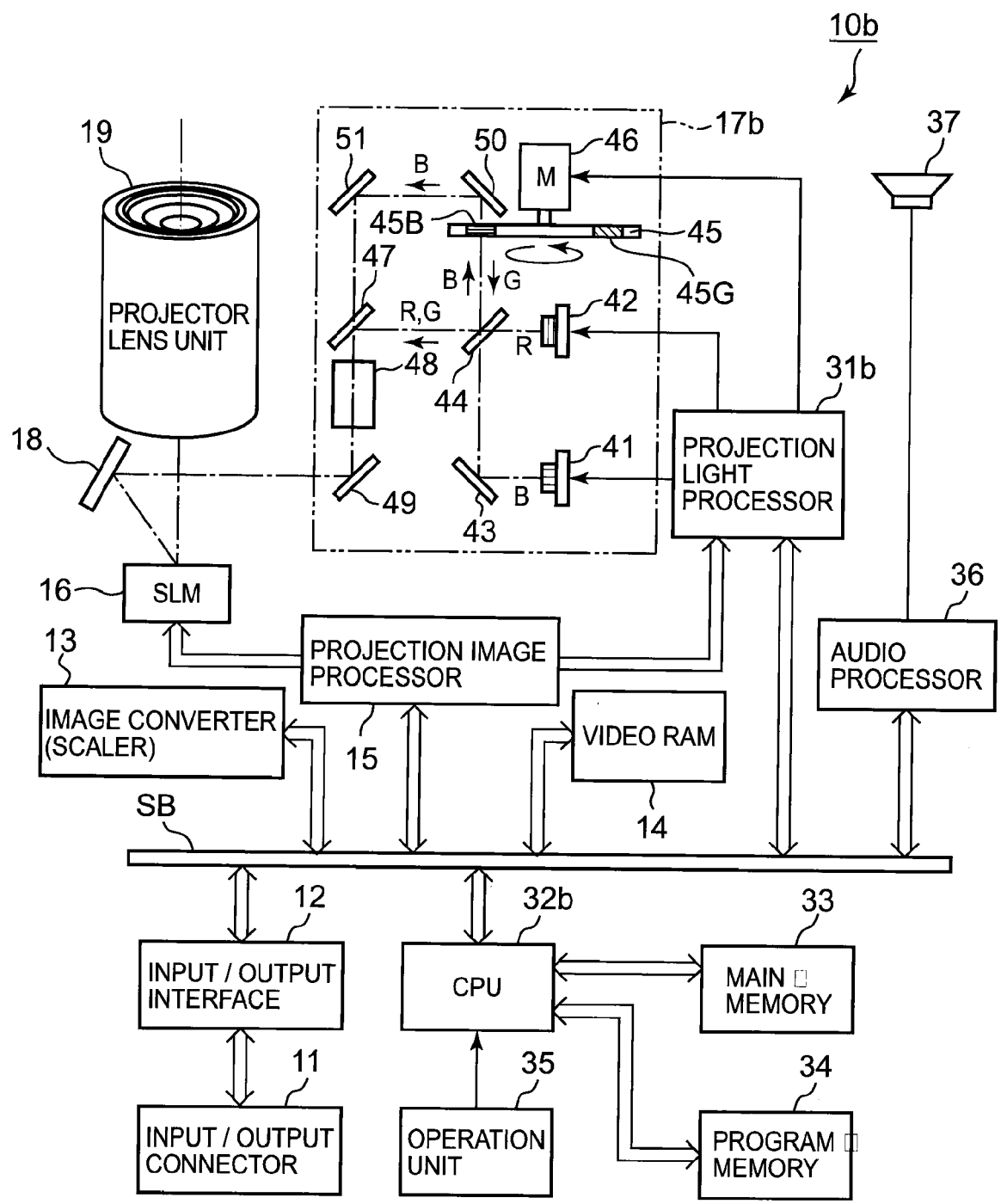
FIG. 4 is a block diagram showing a configuration of functional circuits of a whole data projector according to a second embodiment of the present invention.

FIG. 4 is a block diagram showing a schematic functional configuration of electronic circuits provided in a data projector 10b according to the second embodiment.

The configuration is substantially the same as that shown in FIG. 1, except for a light source unit 17b instead of 17a, a projection light processor 31b controlling the light source unit 17b, and a CPU 32b. The same components are denoted by the same reference numbers, and an explanation thereof will be omitted.

The light source unit 17b has two kinds of light sources; a semiconductor laser 41 emitting blue laser light, and an LED 42 emitting red light.

The blue laser light emitted from the semiconductor laser 41 is reflected on a mirror 43, transmitted through a dichroic mirror 44, and applied at one point on the surface of a color wheel 45. The color wheel 45 is rotated by a motor 46. On the surface of the color wheel 45 to which laser light is applied, a nonluminescent part 45N, described later, a green fluorescence reflection part 45G, and a blue light diffuse transmission part 45S are formed like a ring.

When the green fluorescence reflection part 45G of the color wheel 45 is located at a laser light radiating position, green light is excited by radiating laser light. The excited green light is reflected on the color wheel 45, and then reflected on the dichroic mirror 44. Thereafter, the green light is further reflected on a dichroic mirror 47, transmitted to an integrator 48, where the light is bound into a flux of substantially even brightness distribution, and is reflected on a mirror 49, and sent to the mirror 18.

As shown in FIG. 4, when the blue light diffuse transmission part 45B of the color wheel 45 is located at a laser light radiating position, laser light is diffused on the blue light diffuse transmission part 45S, transmitted through the color wheel 45, and reflected on mirrors 50 and 51. Thereafter, the blue light is transmitted from the dichroic mirror 47 to the integrator 48, where the light is bound into a flux of substantially even brightness distribution, and is reflected on the mirror 49, and sent to the mirror 18.

Red light emitted from the LED 42 reflected on the dichroic mirror 47 through the dichroic mirror 44, and transmitted to the integrator 48, where the light is bound into a flux of substantially even brightness distribution, and is reflected on the mirror 49, and sent to the mirror 18.

As described above, the dichroic mirror 44 has spectral characteristics to transmit blue and red light, and to reflect green light.

The dichroic mirror 47 has spectral characteristics to transmit blue light, and to reflect red and green light.

The projection light processor 31b integrally controls the emission timings of the semiconductor laser 41 and LED 42, and the rotation of the color wheel 45 by the motor 46. The projection light processor 31b controls the emission timings of the semiconductor laser 41 and LED 42, and the rotation of the color wheel 45, according to the timing of receiving image data from the projection image processor 15.

Figure 5:
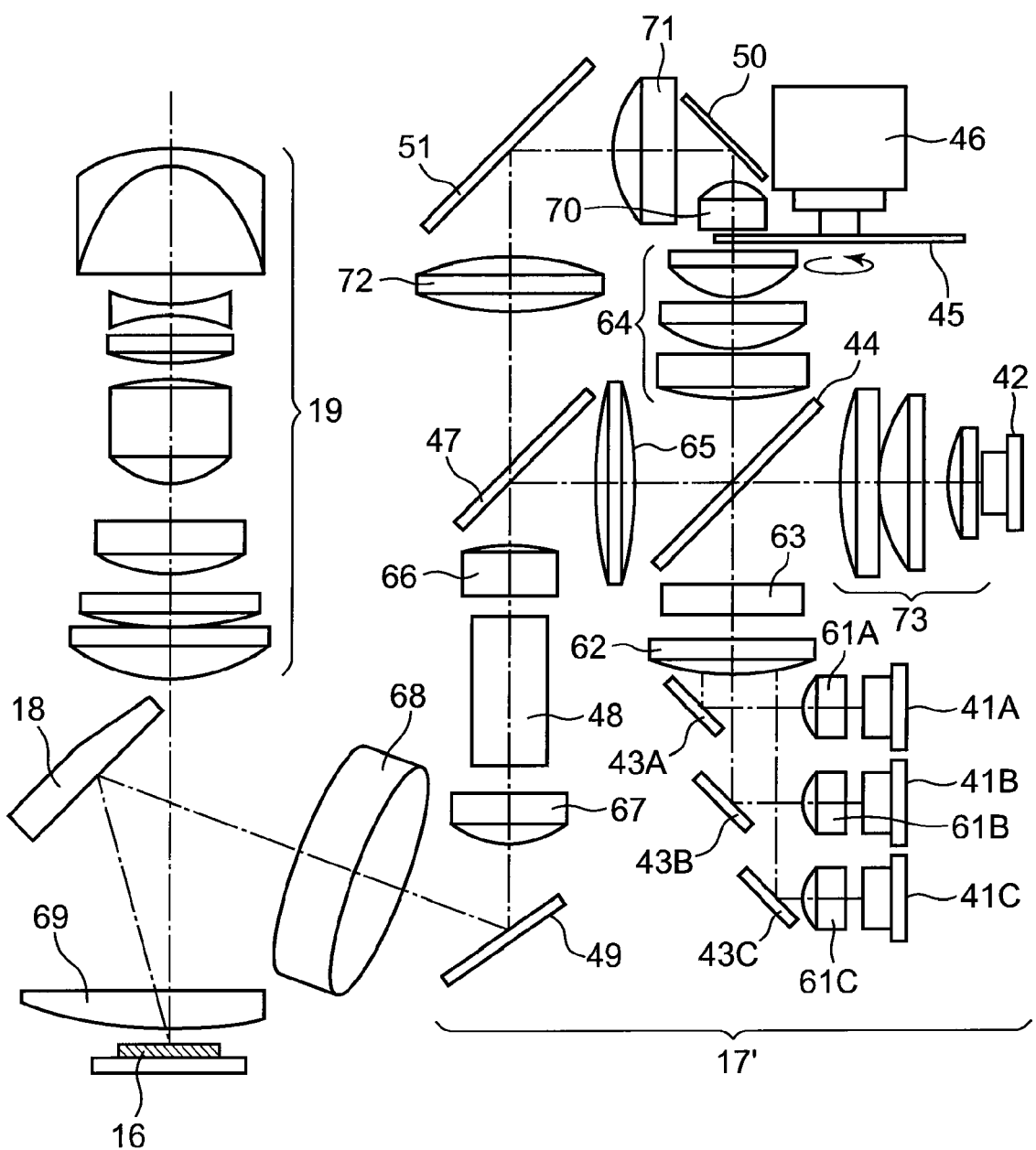
FIG. 5 is a view showing a specific optical configuration of a light source unit according to the second embodiment.

Next, a specific optical configuration of the light source unit 17b is shown in FIG. 5. FIG. 5 shows a planar layout of the configuration around the light source unit 17b.

Here, two or more, for example, three semiconductor lasers 41A, 41B, 41C having the same emission characteristics are provided. The semiconductor lasers 41A, 41B, 41C emit blue laser light with a wavelength of about 450 [nm].

The blue light emitted from the semiconductor lasers 41A, 41B, 41C is transmitted to lenses 61A, 61B, 61C, and reflected on mirrors 43A, 43B, 43C. The blue light is further transmitted to lenses 62 and 63, transmitted to the dichroic mirror 44, and applied to the color wheel 45 through a lens group 64.

On the color wheel 45, as described above, the blue light diffuse transmission part 45B, and green fluorescence reflection part 45G are arranged on the same surface of a ring.

When the green fluorescence reflection part 45G of the color wheel 45 is located at a laser light radiating position, green light with a wavelength of about 530 [nm] is excited by radiating laser light. The excited green light is reflected on the color wheel 45, and then reflected on the dichroic mirror 44 through the lens group 64.

The green light reflected on the dichroic mirror 44 is further reflected on the dichroic mirror 47 through the lens 65. Thereafter, the green light is transmitted from the lens 66 to the integrator 48, where the light is bound into a flux of substantially even brightness distribution, and is reflected on the mirror 49, and sent to the mirror 18 through a lens 68.

The green light reflected on the mirror 18 is applied to the micromirror element 16 through a lens 69. Then, a light figure of the green component is formed by the green reflected light, and is projected to the outside through the lens 69 and projector lens unit 19.

When the blue light diffuse transmission part 45B of the color wheel 45 is located at a blue light radiating position, blue light is transmitted through the color wheel 45 while being diffused by the diffuse transmission part 45B, and is reflected on a mirror 50 through a lens 70 provided at the rear side.

Further, the blue light is reflected on the mirror 51 through a lens 71, transmitted to the dichroic mirror 47 through a lens 72. Thereafter, the blue light is transmitted from the lens 66 to the integrator 48, where the light is bound into a flux of substantially even brightness distribution, and is reflected on the mirror 49 through the lens 67, and sent to the mirror 18 through the lens 68.

On the other hand, the LED 42 generates red light with a wavelength of 620 [nm], for example. The red light generated by the LED 42 is transmitted to the dichroic mirror 44 through a lens group 73, and then reflected on the dichroic mirror 47 through the lens 65. Thereafter, the red light is transmitted from the lens 66 to the integrator 48, where the light is bound into a flux of substantially even brightness distribution, and is reflected on the mirror 49 through the lens 67, and sent to the mirror 18 through the lens 68.

Figure 6:
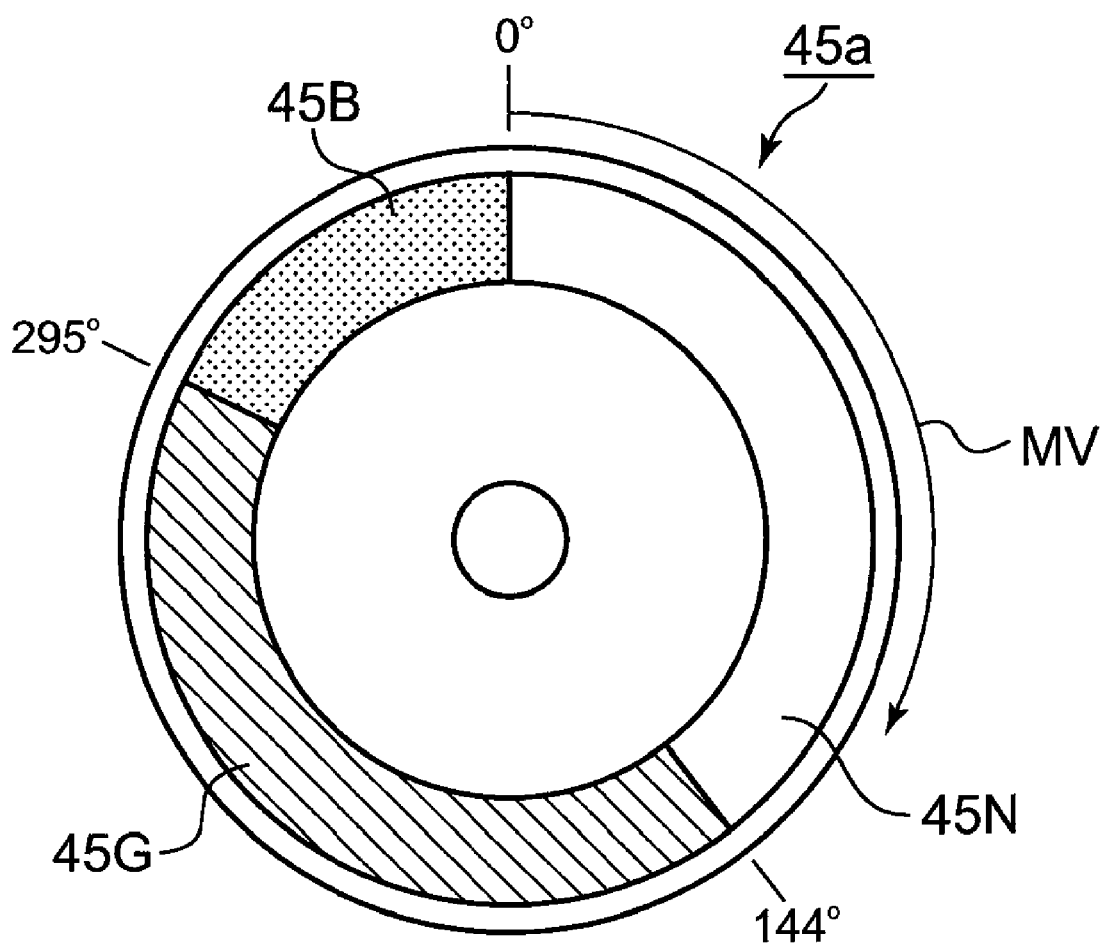
FIG. 6 is a plan view showing a configuration of a color wheel according to the second embodiment.

FIG. 6 is a plan view of a configuration of the color wheel 45. On one side of a flat disc, a nonluminescent part 45N, a green fluorescence reflection part 45G, and a blue light diffuse transmission part 45B are formed as a ring.

The nonluminescent part 45N corresponds to the part equivalent to a light-emitting part of the LED 42, where no fluorescent substance is applied and no transmissive plate is stuck. The green fluorescence reflection part 45G is formed by coating an oxide fluorescent substance, for example, on another area of the flat ring-shaped color wheel 45. The blue light diffuse transmission part 45B is formed by embedding an arc-shaped translucent diffusive substance in another area on the flat plate of the color wheel 45.

In FIG. 6, a reference position of the color wheel 45 is set at a position of 0°, which corresponds to the timing of switching an image frame. This means that when the color wheel 45 is rotated, the blue light emitted from the semiconductor lasers 41A, 41B, 41C is cyclically applied to the nonluminescent part 45N, green fluorescence reflection part 45G, and blue light diffuse transmission part 45B on the circumference of the flat plate, as indicated by the arrow MV.

The nonluminescent part 45N is arranged at a position of 0° to 144° in a rotation phase corresponding to an image frame, with a center angle of about 144°. The green fluorescence reflection part 45G is arranged at a position of 144° to 295° in a rotation phase corresponding to an image frame, with a center angle of about 151°. The blue light diffuse transmission part 45B is arranged at a position of 295° to 360°)(0° in the same rotation phase, with a center angle of about 65°.

Next, operations of the above embodiment will be explained.

Figure 7:
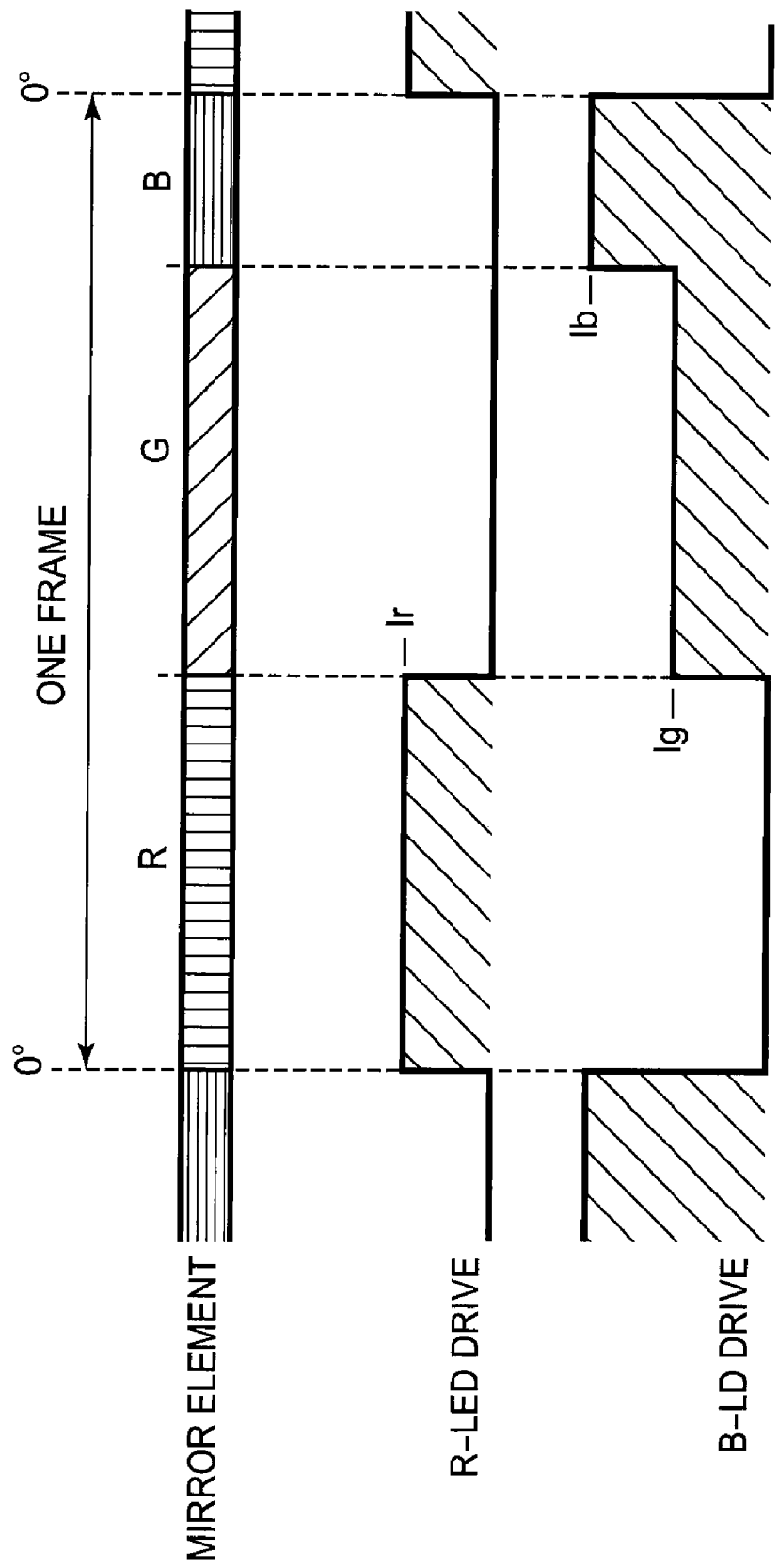
FIG. 7 is a diagram showing the timing of driving a light source unit according to the second embodiment.

FIG. 7 shows the contents of driving the light source unit 17b by the projection light processor 31b under the control of the CPU 32b'.

The mirror element in FIG. 7 indicates the color of light-source light emitted to the micromirror element 16. In FIG. 7, the R-LED drive indicates a drive current of the LED 42, and B-LD indicates a drive current of the semiconductor lasers 41A, 41B, 41C.

In the first R-field of a frame, a drive current Ir for a red image is applied to the LED 42. For the drive current Ir, a current value controlled to prevent decrease in brightness caused by heating is selected, considering the emission characteristics of the LED 42.

While the LED 42 is emitting red light, the semiconductor lasers 41A, 41B, 41C are not driven, and laser light is not emitted to the color wheel 45. During the period equivalent to 144° in terms of the center angle of the color wheel 45, the red light emitted from the LED 42 is reflected on the dichroic mirror 47 through the lens group 73, dichroic mirror 44 and lens 65. Thereafter, the red light is reflected on the mirror 18 through the lens 66, integrator 48, lens 67, mirror 49 and lens 68, and then applied to the micromirror element 16. At this time, the micromirror element 16 displays an image corresponding to the red light by driving the projection image processor 15.

Therefore, a red light figure is formed by the reflected light from the micromirror element 16, and the projector lens unit 19 projects the light figure on a not-shown screen as an object of projection.

In the next G-field, a drive current Ig for a green image is applied to the semiconductor lasers 41A, 41B, 41C instead of the LED 42. For the drive current Ig, a current value controlled to the degree not to cause saturation, which decreases the luminous efficiency, is selected, considering the emission characteristics of the fluorescent substance, for example oxide fluorescent substance, forming the green fluorescence reflection part 45G of the color wheel 45.

During the period equivalent to 151° in terms of the center angle of the color wheel 45, in which the semiconductor lasers 41A, 41B, 41C emit blue light to the green fluorescence reflection part 45G, the green light generated by the excitation is transmitted from the green fluorescence reflection part 45G to the dichroic mirror 44 through the lens group 64, and is reflected on the dichroic mirror 47. Thereafter, the green light is further reflected on the dichroic mirror 47 through the lens 65, and reflected on the mirror 49 through the lens 66, integrator 48 and lens 67, and then reflected on the mirror 18 through the lens 68, and applied to the micromirror element 16. At this time, the micromirror element 16 displays an image corresponding to the green light by driving the projection image processor 15.

Therefore, a green light figure is formed by the reflected light from the micromirror element 16, and the projector lens unit 19 projects the light figure on a not-shown screen as an object of projection.

In the next B-field, a drive current Ib for a blue image is applied to the semiconductor lasers 41A, 41B, 41C. For the drive current Ib, excitation by fluorescent substance is unnecessary, as shown by the B-LD drive in FIG. 7. Therefore, a current sufficiently higher than the drive current Ig can be set for the drive current Ib.

During the period equivalent to 65° in terms of the center angle of the color wheel 45, in which the semiconductor lasers 41A, 41B, 41C emit blue light to the blue light diffuse transmission part 45B, the blue light diffused and transmitted by the blue light diffuse transmission part 45B is reflected on the mirror 50 through the lens 70. Thereafter, the blue light is reflected on the mirror 51 through the lens 71, and then transmitted to the dichroic mirror 47 through the lens 72. Further, the blue light is reflected on the mirror 49 through the lens 66, integrator 48 and lens 67, and reflected on the mirror 18 through the lens 68, and applied to the micromirror element 16. At this time, the micromirror element 16 displays an image corresponding to the blue light by driving the projection image processor 15.

Therefore, a blue light figure is formed by the reflected light from the micromirror element 16, and the projector lens unit 19 projects the light figure on a not-shown screen as an object of projection.

In other words, as red light is emitted from the LED 42 instead of the fluorescent substance, bright red light can be obtained from the RGB fluorescent substance without using a red fluorescent substance having the lowest luminous efficiency.

In the R-field" using the LED 42 as a light-source light, light is emitted at a current value considering the luminous efficiency influenced by heat. Further, the emission period is adjusted not to decrease the total amount of emission light.

In the G-field using light from the fluorescent substance emitting laser light as excitation light, light is emitted at a low current value controlled not to cause saturation. Further, a light figure with sufficient brightness compensating the low luminous efficiency can be obtained by setting the emission period long enough to compensate the total amount of emission light likely to decrease at a low current value.

In contrast, in the B-field using the color of light emitted from the semiconductor lasers 41A, 41B, 41C as a light source, without using the fluorescent substance, a bright light figure can be formed at a high current value so as to compensate the short emission period.

As described above, in the second embodiment, it is possible to project a bright image with high color reproducibility, by considering the different luminous efficiency for each color by combining a light source, fluorescent substance and nonluminescent substance.

The second embodiment refers to the case wherein the B-field is placed after the G-field, and the drive current Ib of the semiconductor lasers 41A, 41B, 41C in the B-field is set higher than the drive current Ig of the semiconductor lasers 41A, 41B, 41C in the G-field, as shown by the configuration of the color wheel 45 in FIG. 6 and the timing of driving the light source unit in FIG. 7.

Figure 8:
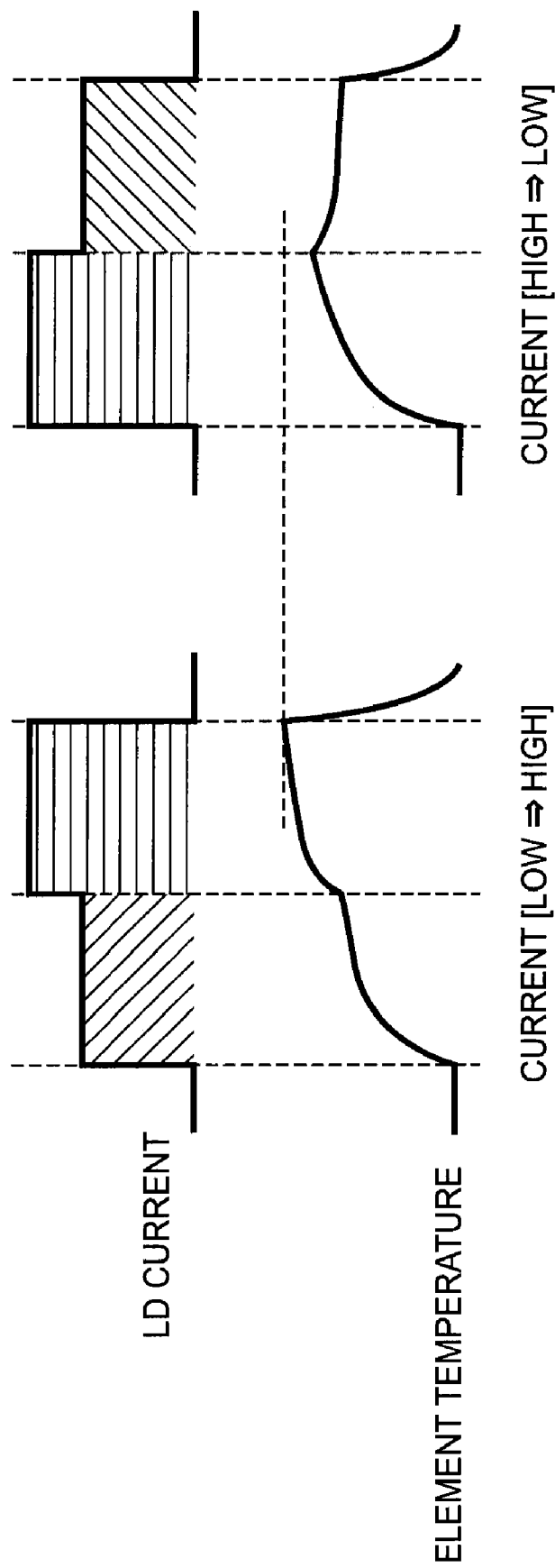
FIGS. 8A and 8B are diagrams showing a drive current and heat changes in a semiconductor laser according to the second embodiment.

It is known that when a semiconductor laser is continuously driven with a different drive current, a temperature change in a semiconductor laser is smaller when a current value is decreased as shown in FIG. 8B, than when a current value is increased as shown in FIG. 8A.

In other words, when a semiconductor laser is used as a light source, it is desirable to drive a semiconductor laser at a lower current value, considering the brightness of emission light and the life of the semiconductor laser 41.

Hereinafter, examples of other operations of the embodiment will be explained for the case considering the temperatures of the elements of the semiconductor lasers 41A, 41B, 41C.

EXAMPLES OF OTHER OPERATIONS

Figure 9:
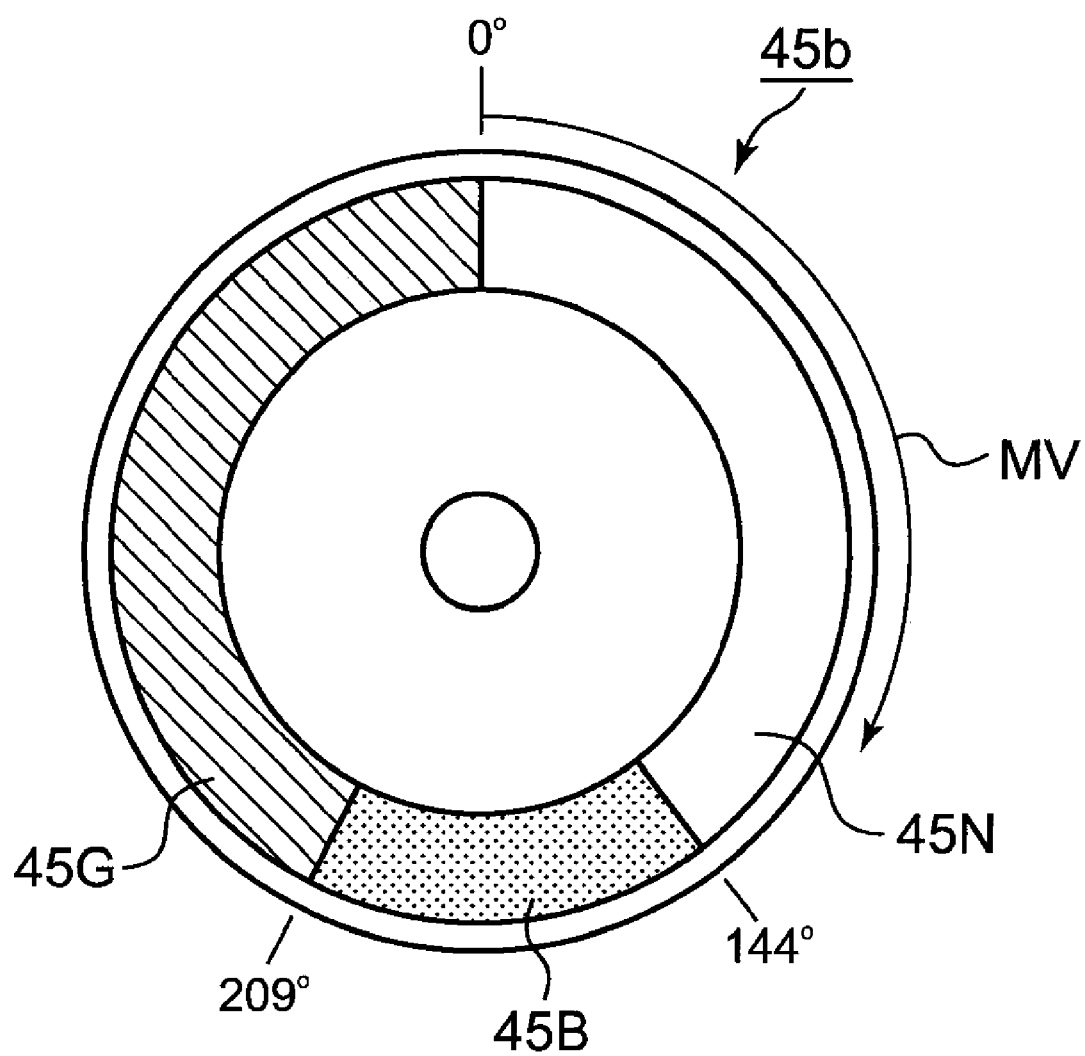
FIG. 9 is a plan view showing a configuration of a color wheel for other operation examples of the second embodiment.

FIG. 9 is a plan view showing a configuration of a color wheel 45b instead of the color wheel 45a. On one side of a flat disc, a nonluminescent part 45N, a blue light diffuse transmission part 45B, and a green fluorescence reflection part 45G are formed as a ring.

In FIG. 9, a reference position of the color wheel 45b is set to 0°, which corresponds to the time of switching an image frame. This means that when the color wheel 45b is rotated, the blue light emitted from the semiconductor lasers 41A, 41B, 41C is cyclically applied to the nonluminescent part 45N, blue light diffuse transmission part 45B, and green fluorescence reflection part 45G on the circumference of the flat disc, as indicated by the arrow MV.

The nonluminescent part 45N is arranged at a position of 0° to 144° in a rotation phase corresponding to an image frame, with a center angle of about 144°. The blue light diffuse transmission part 45B is arranged at a position of 144° to 209° in a rotation phase corresponding to an image frame, with a center angle of about 65°. The green fluorescence reflection part 45G is arranged at a position of 209° to 360° (0°) in the same rotation phase, with a center angle of about 151°.

Next, operations of the above embodiment will be explained.

Figure 10:
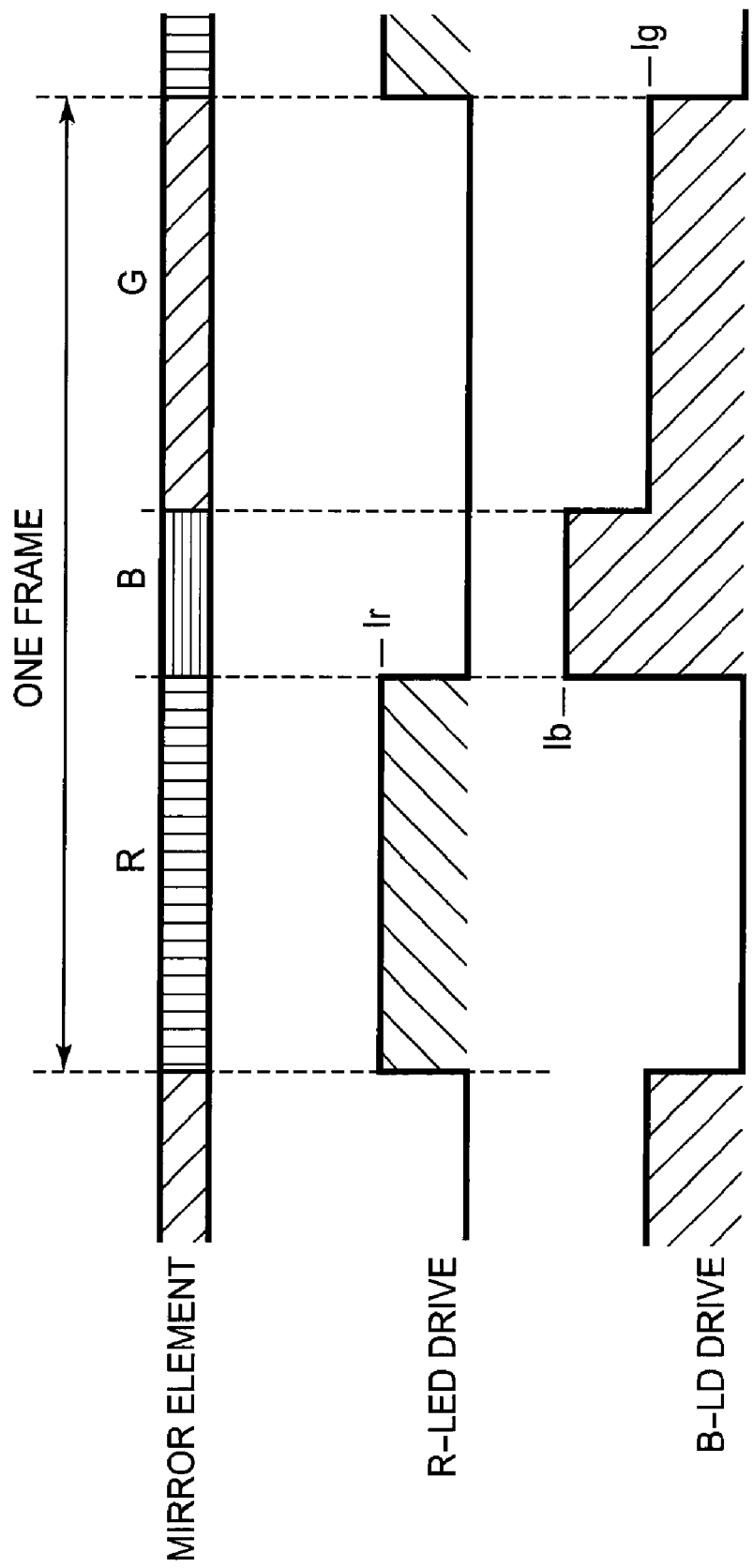
FIG. 10 is a diagram showing the timing of driving a light source unit for other operation examples of the second embodiment.

FIG. 10 shows the contents of driving the light source unit 17b by the projection light processor 31b under the control of the CPU 32b.

The mirror element in FIG. 10 indicates the color of light-source light emitted to the micromirror element 16. In FIG. 10, the R-LED drive indicates a drive current of the LED 42, and B-LD indicates a drive current of the semiconductor lasers 41A, 41B, 41C.

In the first R-field of a frame, a drive current Ir for a red image is applied to the LED 42. For the drive current Ir, a current value controlled to prevent a decrease in brightness caused by heating is selected, considering the emission characteristics of the LED 42.

While the LED 42 is emitting red light, the semiconductor lasers 41A, 41B, 41C are not driven, and laser light is not emitted to the color wheel 45. During the period equivalent to 144° in terms of the center angle of the color wheel 45, the red light emitted from the LED 42 is reflected on the dichroic mirror 47 through the lens group 75, dichroic mirror 44 and lens 65. Thereafter, the red light is reflected on the mirror 18 through the lens 66, integrator 48, lens 67, mirror 49 and lens 68, and then applied to the micromirror element 16. At this time, the micromirror element 16 displays an image corresponding to the red light by driving the projection image processor 15.

Therefore, a red light figure is formed by the reflected light from the micromirror element 16, and the projector lens unit 19 projects the light figure on a not-shown screen as an object of projection.

In the next B-field, a drive current Ib for a blue image is applied to the semiconductor lasers 41A, 41B, 41C instead of the LED 42. For the drive current Ib, excitation by fluorescent substance is unnecessary as shown by the B-LD drive in FIG. 10. Therefore, a current sufficiently higher than the drive current Ig used in the next G-field can be set for the drive current Ib.

During the period equivalent to 65° in terms of the center angle of the color wheel 45, in which the semiconductor lasers 41A, 41B, 41C emit blue light to the blue light diffuse transmission part 45B, the blue light diffused and transmitted by the blue light diffuse transmission part 45B is reflected on the mirror 50 through the lens 70. Thereafter, the blue light is reflected on the mirror 51 through the lens 71, and then transmitted to the dichroic mirror 47 through the lens 72. Further, the blue light is reflected on the mirror 49 through the lens 66, integrator 48 and lens 67, and reflected on the mirror 18 through the lens 68, and applied to the micromirror element 16. At this time, the micromirror element 16 displays an image corresponding to the blue light by driving the projection image processor 15.

Therefore, a blue light figure is formed by the reflected light from the micromirror element 16, and the projector lens unit 19 projects the light figure on a not-shown screen as an object of projection.

In the next G-field, a drive current Ig for a green image lower than the current Ib is applied to the semiconductor lasers 41A, 41B, 410. For the drive current Ig, a current value considering the emission characteristics of the fluorescent substance, for example oxide fluorescent substance, forming the green fluorescence reflection part 45G of the color wheel 45 is selected.

During the period equivalent to 151° in terms of the center angle of the color wheel 45, in which the semiconductor lasers 41A, 41B, 410 emit blue light to the green fluorescence reflection part 45G, the green light generated by the excitation is transmitted from the green fluorescence reflection part 45G to the dichroic mirror 44 through the lens group 64, and is reflected on the dichroic mirror 47. Thereafter, the green light is further reflected on the dichroic mirror 47 through the lens 65, and reflected on the mirror 49 through the lens 66, integrator 48 and lens 67, and reflected on the mirror 18 through the lens 68, and applied to the micromirror element 16. At this time, the micromirror element 16 displays an image corresponding to the green light by driving the projection image processor 15.

Therefore, a green light figure is formed by the reflected light from the micromirror element 16, and the projector lens unit 19 projects the light figure on a not-shown screen as an object of projection.

In other words, a bright light figure compensating the low luminous efficiency can be obtained by setting the periods of the R-field using the LED 42 as a light-source light and G-field using an excitation light from the fluorescent substance emitting laser light, sufficiently long.

In contrast, in the B-field using the color of light from the semiconductor lasers 41A, 41B, 41C as a light source, without using the fluorescent substance, a bright light figure can be formed at a high current value compensating the short emission period.

Further, in the second embodiment, in the B-field and G-field which continuously drive the semiconductor lasers 41A, 41B, 41C, the B-field driven at a larger current value is arranged before the G-field.

Therefore, as shown in FIGS. 8A and 8B, a temperature increase in the semiconductor lasers 41A, 41B, 41C can be controlled to be low, and a decrease in the brightness of emission light can be minimized, and the life of the semiconductor lasers 41A, 41B, 41C can be prolonged.

In the first and second embodiments, the semiconductor lasers 20A to 20C (41A, 41B, 41C) are oscillated to generate blue laser light, the color wheel 24 (45a, 45b) emits blue light and green light, the LED 21 (42) emits red light. However, the embodiments are not limited to them. Any light source unit using two or more light sources, and a projector using such a light source unit may be applicable, so as to compensate the brightness balance by using other light sources, when the brightness balance of primary colors emitted from one light source is not practicable.

In the above embodiments, a DLP type data projector is used. However, the embodiments are applicable to a liquid crystal projector using a transmissive monochrome liquid crystal panel to form a light figure.

The embodiments are not limited to those described herein. The embodiments may be modified in various forms in practical phases without departing from the essential characteristics. The functions executed by the embodiments may be appropriately combined as far as possible. The embodiments described herein include various steps. The embodiments may be realized in other specific forms by appropriately combining the constituent elements disclosed herein. If the same effects can be obtained, the embodiments may be realized by deleting some constituent elements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a light source configured to emit light in a predetermined wavelength range;
   a light-source light generator configured to generate light-source light of two or more colors with different luminous efficiencies by time-sharing by using the light emitted from the light source;
   a light source controller configured to control timings of driving the light source and light-source light generator, so that the light-source light of two or more colors generated by the light-source light generator are cyclically generated, by setting a light-emitting period of at least one light-source light color having a higher luminous efficiency out of the two or more colors generated by the light-source light generator, shorter than those of the other light-source light colors, and setting a drive power of the light source during generation of the light-source light color whose light-emitting period is set short, greater than a drive power of the light source during generation of the other light-source light colors;

an input unit configured to input an image signal; and
a projector configured to form a light figure of colors corresponding to an image signal input from the input unit by using the light-source light generated based on the control of the light source controller, and to project the light figure;
wherein in one period that is a predetermined period, the light source controller (i) sets the light-emitting period of the at least one light-source light color having the higher luminous efficiency, shorter than those of the other light-source light colors, and sets the drive power of the light source during generation of the light-source light color whose light-emitting period is set short, greater than the drive power of the light source generation of the other light-source light colors, and (ii) sets the light-emitting period of the other light source light colors longer, by an extent equivalent to setting the light-emitting period of the at least one light-source light color having the higher luminous efficiency shorter, and sets the drive power of the light source during generation of the other light-source light colors smaller, by an extent equivalent to setting the drive power of the light source during generation of the light-source light color whose light-emitting period is set short, so that a predetermined white balance is kept before and after the settings.

2. The projection apparatus according to claim 1, wherein:
the light source is configured to emit blue wavelength light, and
the light-source light generator comprises a rotatable color wheel which includes (i) an area coated with a fluorescent substance to emit red and green wavelength light and (ii) a diffusion area to diffuse and transmit the light from the light source.

3. A projection apparatus comprising:
a first light source configured to emit light in a first wavelength range;
a light-source light generator configured to generate light-source light of two or more colors with different luminous efficiencies by time-sharing by using the light emitted from the first light source;
a second light source configured to emit light in a second wavelength range different from the first wavelength range;
a light source controller configured to control timings of driving the first and second light sources and the light-source light generator, so that the light-source light of two or more colors generated by the light-source light generator and the light-source light emitted from the second light source are cyclically generated, by setting a light-emitting period of at least one light-source light color having a higher luminous efficiency out of the two or more colors generated by the light-source light generator, shorter than those of the other light-source light colors, and setting a drive power of the first light source during generation of the light-source light color whose light-emitting period is set short, greater than a drive power of the first light source during generation of the other light-source light colors;
an input unit configured to input an image signal; and
a projector configured to form a light figure of colors corresponding to an image signal input from the input unit, by using the light-source light generated based on the control of the light source controller, and to project the light figure;
wherein in one period that is a predetermined period, the light source controller sets the light-emitting period of the at least one light-source light color having the higher luminous efficiency, shorter than those of the other light-source light colors, and sets the drive power of the first light source during generation of the light-source light color whose light-emitting period is set short, greater than the drive power of the first light source during generation of the other light-source light colors.

4. The projection apparatus according to claim 3, wherein:
the first light source is configured to emit blue wavelength light,
the second light source is configured to emit red wavelength light, and
the light-source light generator comprises a rotatable color wheel which includes (i) an area coated with a fluorescent substance to emit green wavelength light and (ii) a diffusion area to diffuse and transmit the light from the first light source.

5. The projection apparatus according to claim 3, wherein the light-source light generator generates the light-source light of the color whose light-emitting period is set short faster than the light-source light generator generates the light-source light of the other colors, in the predetermined period which is a cyclic period.

6. The projection apparatus according to claim 3, wherein the light source controller sets the light-emitting period of the other light-source light colors longer, by an extent equivalent to setting the light-emitting period of the at least one light-source light color having the higher luminous efficiency shorter, and sets the drive power of the light source during generation of the other light-source light colors smaller, by an extent equivalent to setting the drive power of the light source during generation of the light-source light color whose light-emitting period is set short, so that a predetermined white balance is kept before and after the settings.

7. A projection method applied to a projection apparatus including a light source configured to emit light in a predetermined wavelength range, a light-source light generator configured to generate light-source light of two or more colors with different luminous efficiencies by time-sharing by using the light emitted from the light source, an input unit configured to input an image signal, and a projector configured to form a light figure of colors corresponding to an image signal input from the input unit by using light-source light, and to project the light figure, the method comprising:
controlling timings of driving the light source and light-source light generator, so that the light-source light of two or more colors generated by the light-source light generator are cyclically generated, by setting a light-emitting period of at least one light-source light color having a higher luminous efficiency out of the two or more colors generated by the light-source light generator, shorter than those of the other light-source light colors, and setting a drive power of the light source during generation of the light-source light color whose light-emitting period is set short, greater than a drive power of the light source during generation of the other light-source light colors;
wherein the controlling comprises, in one period that is a predetermined period, (i) setting the light-emitting period of the at least one light-source light color having the higher luminous efficiency, shorter than those of the other light-source light colors, and setting the drive power of the light source during generation of the light-source light color whose light-emitting period is set short, greater than the drive power of the light source generation of the other light-source light colors, and (ii) setting the light-emitting period of the other light source light colors longer, by an extent equivalent to setting the light-emitting period of the at least one light-source light color having the higher luminous efficiency shorter, and setting the drive power of the light source during generation of the other light-source light colors smaller, by an extent equivalent to setting the drive power of the light source during generation of the light-source light color whose light-emitting period is set short, so that a predetermined white balance is kept before and after the settings.

8. A projection method applied to a projection apparatus including a first light source configured to emit light in a first wavelength range, a light-source light generator configured to generate light-source light of two or more colors with different luminous efficiencies by time-sharing by using the light emitted from the first light source, a second light source configured to emit light in a second wavelength range different from the first wavelength range, an input unit configured to input an image signal, and a projector configured to form a light figure of colors corresponding to an image signal input from the input unit by using light-source light, and to project the light figure, the method comprising:

controlling timings of driving the first and second light sources and the light-source light generator, so that the light-source light of two or more colors generated by the light-source light generator and the light-source light emitted from the second light source are cyclically generated, by setting a light-emitting period of at least one light-source light color having a higher luminous efficiency out of the two or more colors generated by the light-source light generator, shorter than those of the other light-source light colors, and setting a drive power of the first light source during generation of the light-source light color whose light-emitting period is set short, greater than a drive power of the first light source during generation of the other light-source light colors; and wherein the controlling comprises, in one period that is a predetermined period, setting the light-emitting period of the at least one light-source light color having the higher luminous efficiency, shorter than those of the other light-source light colors, and setting the drive power of the first light source during generation of the light-source light color whose light-emitting period is set short, greater than the drive power of the first light source during generation of the other light-source light colors.

* * * * *